(12) United States Patent
Kowalevicz et al.

(10) Patent No.: US 11,791,904 B2
(45) Date of Patent: Oct. 17, 2023

(54) RECEIVER AND SYSTEM FOR TRANSPORTING AND DEMODULATING COMPLEX OPTICAL SIGNALS

(71) Applicant: RAYTHEON COMPANY, Waltham, MA (US)

(72) Inventors: Andrew Kowalevicz, Arlington, VA (US); Benjamin P. Dolgin, Alexandria, VA (US); Gary M. Graceffo, Burke, VA (US); James Talamonti, McLean, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 17/371,635

(22) Filed: Jul. 9, 2021

(65) Prior Publication Data
US 2022/0014276 A1    Jan. 13, 2022

Related U.S. Application Data

(60) Provisional application No. 63/050,388, filed on Jul. 10, 2020.

(51) Int. Cl.
*H04B 10/61*    (2013.01)
*H04B 10/67*    (2013.01)
*H04L 7/00*    (2006.01)

(52) U.S. Cl.
CPC ....... *H04B 10/6165* (2013.01); *H04B 10/615* (2013.01); *H04B 10/65* (2020.05);
(Continued)

(58) Field of Classification Search
None
See application file for complete search history.

(56) References Cited

U.S. PATENT DOCUMENTS 5,907,403 A    5/1999  Andrews et al.
8,478,384 B2   7/2013  Schmitt et al.
(Continued)

FOREIGN PATENT DOCUMENTS

CN    105092536 A    11/2015
CN    105334519 A    2/2016
(Continued)

OTHER PUBLICATIONS

Ruege et al: "Multimode Waveguides Coupled to Single Mode Ring Resonators", JLT, vol. 27., No. 12, Jun. 15, 2009, pp. 2035-2043 (Year: 2009).*

(Continued)

*Primary Examiner* — Li Liu
(74) *Attorney, Agent, or Firm* — Lando & Anastasi, LLP

(57) ABSTRACT

An optical signal receiver includes a multimode waveguide for receiving a complex modulated optical signal, an optical resonator that receives the complex modulated optical signal from the multimode waveguide and converts the complex modulated optical signal to an intensity modulated signal, and a detector that is configured to convert the intensity modulated signal into an electrical signal, the electrical signal having an amplitude indicative of an intensity of the intensity modulated signal from the optical resonator, and that provides a detected signal.

22 Claims, 6 Drawing Sheets

(52) U.S. Cl.
CPC .......... *H04B 10/67* (2013.01); *H04B 10/676*
(2013.01); *H04L 7/0075* (2013.01); *H04B*
*2210/252* (2013.01)

(56) References Cited

U.S. PATENT DOCUMENTS

| | | | |
|---|---|---|---|
| 8,971,709 B2 | 3/2015 | Liu et al. | |
| 9,018,575 B2 | 4/2015 | Kowalevicz et al. | |
| 9,165,963 B2 | 10/2015 | Kowalevicz et al. | |
| 9,171,219 B2 | 10/2015 | Kowalevicz | |
| 9,323,034 B2 | 4/2016 | Dolgin | |
| 9,400,414 B2 | 7/2016 | Kowalevicz | |
| 9,451,185 B2 | 9/2016 | Dolgin et al. | |
| 9,503,660 B2 | 11/2016 | Kowalevicz et al. | |
| 9,535,245 B1 | 1/2017 | Kowalevicz | |
| 9,538,096 B2 | 1/2017 | Dolgin | |
| 9,887,779 B2 | 2/2018 | Kowalevicz | |
| 9,973,281 B2 | 5/2018 | Kowalevicz et al. | |
| 10,164,765 B2 | 12/2018 | Dolgin et al. | |
| 10,177,856 B2 | 1/2019 | Kowalevicz et al. | |
| 10,205,526 B2 | 2/2019 | Kowalevicz | |
| 10,225,020 B2 | 3/2019 | Dolgin et al. | |
| 10,243,670 B2 | 3/2019 | Kowalevicz et al. | |
| 10,243,673 B2 | 3/2019 | Dolgin et al. | |
| 10,250,292 B2 * | 4/2019 | Graceffo | H04B 10/505 |
| 10,256,917 B2 * | 4/2019 | Dolgin | H04B 10/5561 |
| 10,305,602 B2 | 5/2019 | Dolgin et al. | |
| 10,313,022 B2 | 6/2019 | Dolgin et al. | |
| 10,340,965 B2 | 7/2019 | Dolgin et al. | |
| 10,374,743 B2 | 8/2019 | Dolgin et al. | |
| 10,378,880 B2 | 8/2019 | Dolgin et al. | |
| 10,498,464 B2 | 12/2019 | Graceffo et al. | |
| 10,530,494 B2 | 1/2020 | Dolgin et al. | |
| 10,554,306 B1 | 2/2020 | Graceffo et al. | |
| 10,571,774 B2 | 2/2020 | Graceffo et al. | |
| 10,637,580 B2 | 4/2020 | Dolgin et al. | |
| 10,686,533 B2 | 6/2020 | Dolgin et al. | |
| 10,714,251 B2 | 7/2020 | Dolgin et al. | |
| 10,826,603 B1 | 11/2020 | Kowalevicz et al. | |
| 10,924,189 B2 | 2/2021 | Kowalevicz et al. | |
| 11,012,160 B2 | 5/2021 | Kowalevicz et al. | |
| 11,101,896 B2 | 8/2021 | Kowalevicz et al. | |
| 11,133,873 B1 | 9/2021 | Kowalevicz et al. | |
| 11,159,244 B2 | 10/2021 | Graceffo et al. | |
| 11,159,245 B2 | 10/2021 | Kowalevicz et al. | |
| 2005/0036534 A1 | 2/2005 | Baney | |
| 2006/0029111 A1 | 2/2006 | Liu | |
| 2009/0038794 A1 | 2/2009 | Yamate et al. | |
| 2010/0172649 A1 | 7/2010 | Graves | |
| 2011/0215344 A1 | 9/2011 | Dardy et al. | |
| 2013/0221211 A1 * | 8/2013 | Witzens | H04B 10/58 250/216 |
| 2014/0299751 A1 | 10/2014 | Tang et al. | |
| 2016/0094308 A1 * | 3/2016 | Liboiron-Ladouceur | G02B 6/12004 398/44 |
| 2018/0091228 A1 * | 3/2018 | Kowalevicz | G02F 2/00 |
| 2018/0091230 A1 * | 3/2018 | Dolgin | H04B 10/671 |
| 2018/0091232 A1 * | 3/2018 | Dolgin | H01S 3/10092 |
| 2018/0102853 A1 * | 4/2018 | Dolgin | G02B 5/28 |
| 2018/0136036 A1 | 5/2018 | Galtarossa et al. | |
| 2018/0145764 A1 * | 5/2018 | Dolgin | H04B 10/615 |
| 2018/0145765 A1 * | 5/2018 | Kowalevicz | H04B 10/615 |
| 2019/0007091 A1 * | 1/2019 | Graceffo | H04B 10/40 |
| 2019/0158208 A1 * | 5/2019 | Dolgin | H04B 10/677 |
| 2019/0280780 A1 | 9/2019 | Graceffo et al. | |
| 2019/0305855 A1 | 10/2019 | Dolgin et al. | |
| 2019/0319714 A1 | 10/2019 | Kowalevicz et al. | |
| 2020/0067626 A1 * | 2/2020 | Dupuis | H04J 14/02 |
| 2020/0136727 A1 | 4/2020 | Graceffo et al. | |
| 2020/0371328 A1 | 11/2020 | Kowalevicz et al. | |
| 2020/0403709 A1 | 12/2020 | Graceffo et al. | |
| 2020/0409189 A1 | 12/2020 | Graceffo et al. | |
| 2021/0006336 A1 | 1/2021 | Kowalevicz et al. | |
| 2021/0021351 A1 | 1/2021 | Kowalevicz et al. | |
| 2021/0021449 A1 | 1/2021 | Graceffo et al. | |
| 2021/0041515 A1 | 2/2021 | Dolgin | |
| 2021/0099232 A1 | 4/2021 | Graceffo et al. | |
| 2021/0099234 A1 | 4/2021 | Graceffo et al. | |
| 2021/0105073 A1 | 4/2021 | Graceffo et al. | |
| 2021/0126715 A1 | 4/2021 | Graceffo et al. | |
| 2021/0314071 A1 | 10/2021 | Graceffo et al. | |
| 2022/0014276 A1 | 1/2022 | Kowalevicz et al. | |
| 2022/0166613 A1 | 5/2022 | Cruz et al. | |

FOREIGN PATENT DOCUMENTS

| | | |
|---|---|---|
| EP | 2521289 A1 | 11/2012 |
| WO | 2021127740 A1 | 7/2021 |

OTHER PUBLICATIONS

International Search Report and Written Opinion in International Patent Application No. PCT/US2021/041055 dated Nov. 3, 2021.
Ruege, A. C. & Reano, R. M., "Multimode Waveguides Coupled to Single Mode Ring Resonators, "Journal of Lightwave Technology, IEEE, (2009), vol. 27, No. 12, pp. 2035-2043.
THORLABS. "Single Mode Fiber Optic Circulators." Oct. 30, 2020, https://web.archive.org/web/20201030060037/https:/www.thorlabs.com/newgrouppage9.cfm?objectgroup_id=373.
International Search Report and Written Opinion of PCT application PCT/US2022/053710 dated May 8, 2023.
DKPhotonics optical passive component: "1310/1550nm 3 port Multimode Optical Circulator" Sep. 2021 (Year: 2021).

* cited by examiner

RECEIVER AND SYSTEM FOR TRANSPORTING AND DEMODULATING COMPLEX OPTICAL SIGNALS

CROSS-REFERENCE TO RELATED APPLICATIONS

This application claims priority under 35 U.S.C. § 119(e) to U.S. Provisional Patent Application Ser. No. 63/050,388 titled "RECEIVER AND SYSTEM FOR TRANSPORTING AND DEMODULATING COMPLEX OPTICAL SIGNALS," filed Jul. 10, 2020, the subject matter of which being incorporated herein in its entirety.

BACKGROUND

Light waves may be made to carry information by modulating a light source, often a laser source, to change various properties of the light, such as its amplitude, phase, frequency, wavelength, etc. The light waves may be in the visible spectral band, the infrared spectral band, or another region of the electromagnetic spectrum. Optical receivers receive the light waves and measure properties or variations of the light wave, such as the amplitude, phase transitions, and the like, from which the underlying signal and the information may be recovered.

Phase modulation of light signals may convey useful information. Information encoded in phase modulation may include transmitted communication data, or may include other information such as information about the source of the optical signal, interaction of the optical signal with an object, the optical channel through which the optical signal traveled, and/or objects with which it interacted. Compared to typical amplitude modulation receivers, phase modulation receivers can be significantly more complex, requiring precision optics, local oscillators, Fiber Bragg Gratings (FBG), and/or delay line interferometers (DLI), etc.

A receiver for modulated light waves should collect signal from a large enough area that the acquired signal power is high enough for accurate detection. Conventionally, a telescope may be aimed at the light source and the cross-sectional area of the telescope, or aperture, may determine how much signal power is collected and concentrated (e.g., focused) at a receiver. When such light is phase modulated, optimal reception occurs if all the light rays (across the cross-section of the telescope) arrive at the detector in unison as a single wavefront, maintaining alignment of the original phase relationships of the light rays. Wavefront correction may be required in conventional light-focusing systems, e.g., if the light rays have propagated through varying media along the way, or were skewed, delayed, aberrated, or the like, as is typical for light waves traveling some distance through the atmosphere. Such systems may use adaptive optics to attempt to correct the light rays to their original phase relationships, but such systems are complex, fragile, and costly.

Optical signals with coherent/complex modulation have traditionally required single-mode fiber for optical transport and demodulation purposes. This limits receiver architecture flexibility and establishes a requirement to use equipment with precision tolerances that increase costs. In certain other applications, such as free-space optical communication, additional hardware is also needed to meet this demand.

To transport complex optical signals in any non-line-of-sight application has required single-mode optical fiber. This demand is met in two ways. For fiber-based communication, the signal is generally generated and maintained in single mode fiber from transmitter to receiver. In the case that it is launched into free space, the wavefront is maintained to allow for efficient coupling back into the small single mode fiber diameter needed for single mode propagation. For truly free-space communication systems, where wavefront distortion occurs, adaptive optics systems have been used at the collection aperture. Adaptive optic systems correct for aberrations of the beam and allow for efficient coupling to single mode fiber for transport and demodulation. Both approaches limit the design of the receiver and/or add cost/complexity to the systems.

SUMMARY

In accordance with one aspect, there is provided an optical signal receiver. The optical signal receiver comprises an optical waveguide for receiving a complex modulated optical signal, an optical resonator that receives the complex modulated optical signal from the waveguide and converts the complex modulated optical signal to an intensity modulated signal, and a detector that is configured to convert the intensity modulated signal into an electrical signal, the electrical signal having an amplitude indicative of an intensity of the intensity modulated signal from the optical resonator, and that provides a detected signal. In some embodiments, an optical resonator may include one or more of an etalon or a Fabry-Perot resonator, interferometers, and the like. Additionally, the optical resonator and etalon structures may be formed as a laminate, layer, film, coating, or the like. This may include Fabry-Perot etalons, optical delay line(s), or other types of resonators (including but not limited to common-path or double-path interferometers, and non-planar resonators), which are configured to sense variations, such as phase variations or modulations, in the received optical signals.

In some embodiments, more than one optical resonator is used. In some embodiments, a splitter and two or more etalons with different lengths and individual detectors are used.

In some embodiments, the waveguide is not single mode and the relative phase between the multiple modes of the complex modulated optical signal is not preserved.

In some embodiments, the receiver does not include any adaptive optics to correct for wavefront distortion for detection and does not include any local oscillators or mixers for measuring phase of the complex modulated optical signal.

In some embodiments, the waveguide is a multimode waveguide that includes propagation mediums having a multimode nature, such as an optical fiber, a step index fiber, a graded multimode fiber, and a spatial division multiplex multimode fiber.

In some embodiments, the complex modulated optical signal comprises a plurality of modes having a plurality of phase deviations or phase differences. The optical resonator may have a plurality of regions, wherein each region is configured to produce a temporary change in intensity of the optical signal energy in response to a phase change in the complex modulated optical signal so as to provide an average change in intensity of the intensity modulated signal that is related to the magnitude of plurality of phase changes of the complex modulated optical signal.

In some embodiments, the optical signal receiver further comprises a processor that receives the detected signal and that processes it so as to mitigate any effects of phase disturbance to the complex modulated optical signal and to determine information encoded in the complex modulated optical signal.

In some embodiments, the optical signal receiver further comprises a focusing optic that focuses a free space transmitted complex modulated optical signal into the waveguide.

In some embodiments, the waveguide has a length that provides for the optical resonator to be located remotely from an input to the receiver so that complex modulated optical signal can be demodulated remotely from the input to the receiver.

In some embodiments, the optical signal receiver further comprises a focusing optic aligned with an output of the optical resonator and configured to focus the intensity modulated optical signal to the detector. In some embodiments, the light output from the optical detector is focused to a multimode fiber which is focused to a detector for detection and conversion of the signal output from the Etalon.

In some embodiments, the optical signal receiver further comprises an amplifier for amplifying the complex modulated optical signal.

In accordance with another aspect, there is provided an optical system. The optical system comprises a transmitter that transmits a complex modulated optical signal over a medium, and a receiver that receives that complex modulated optical signal and determines information encoded in the complex modulated optical signal. The receiver includes a waveguide that receives the complex modulated optical signal, an optical resonator that receives the complex modulated optical signal from the waveguide and converts the complex modulated optical signal to an intensity modulated signal, and a detector that is configured to convert the intensity modulated signal into an electrical signal, the electrical signal having an amplitude indicative of an intensity of the intensity modulated signal from the optical resonator, and that provides a detected signal.

In some embodiments, more than one optical resonator is used. In some embodiments, a splitter and two or more etalons with different lengths and individual detectors are used.

In some embodiments, the medium is one of free space and the multi-mode waveguide.

In some embodiments, the waveguide is not a single mode fiber and the relative phase between the multiple modes of the complex modulated optical signal is not preserved.

In some embodiments, the receiver does not include any adaptive optics to correct for wavefront distortion for detection and does not include any local oscillators or mixers for measuring phase of the complex modulated optical signal.

In some embodiments, the waveguide is a multimode waveguide that includes propagation mediums having a multimode nature, such as, one of a step index fiber, a graded multimode fiber, and a spatial division multiplex multimode fiber.

In some embodiments, the complex modulated optical signal comprises a plurality of modes having a plurality of phase deviations or phase differences. The optical resonator may have a plurality of regions, wherein each region is configured to produce a temporary change in intensity of the optical signal energy in response to a phase change in the complex modulated optical signal so as to provide an average change in intensity of the intensity modulated signal that is related to the magnitude of plurality of phase changes of the complex modulated optical signal.

In some embodiments, the optical system further comprises a processor that receives the detected signal and that processes it so as to mitigate any effects of phase disturbance to the complex modulated optical signal and to determine information encoded in the complex modulated optical signal.

In some embodiments, the optical system further comprises a focusing optic that focuses a free space transmitted complex modulated optical signal into the waveguide.

In some embodiments, the waveguide has a length that provides for the optical resonator to be located remotely from an input to the receiver so that the complex modulated optical signal can be demodulated remotely from the input to the receiver.

In some embodiments, the optical system further comprises a focusing optic aligned with an output of the optical resonator and configured to focus the intensity modulated optical signal to the detector.

In some embodiments, the optical system further comprises an amplifier for amplifying the complex modulated optical signal.

In accordance with another aspect, there is provided a method of detecting information encoded in a complex modulated optical signal. The method comprises receiving the complex modulated optical signal with a waveguide, transmitting the complex modulated optical signal through the waveguide to an optical resonator, converting the complex modulated optical signal to an intensity modulated optical signal with the optical resonator, and converting the intensity modulated optical signal into an electrical signal, the electrical signal having an amplitude indicative of an intensity of the intensity modulated signal from the optical resonator.

In some embodiments, more than one optical resonator is used. In some embodiments, a splitter and two or more etalons with different lengths and individual detectors are used.

In some embodiments, the method further comprises transmitting the complex modulated optical signal to the receiver with one of free space and the multi-mode waveguide.

In some embodiments, transmitting with the waveguide consists of transmitting with one of a step index fiber, a graded multimode fiber, and a spatial division multiplex multimode fiber.

In some embodiments, the transmitting the complex modulated optical signal comprises transmitting a plurality of modes having a plurality of phase deviations or phase differences, and further comprising receiving the complex modulated optical signal at the waveguide with the plurality of modes having the plurality of phase deviations or phase differences caused by transmission through the free space.

In some embodiments, the transmitting the complex modulated optical signal comprises transmitting a plurality of modes having a plurality of time delays having the same phase deviation, and further comprising receiving the complex modulated optical signal at the waveguide with the plurality of time delays having the same phase deviation caused by transmission through the free space.

In some embodiments, converting comprises providing an average change in intensity of the intensity modulated signal that is related to the magnitude of plurality of phase changes of the complex modulated optical signal.

In some embodiments, the method further comprises processing the detected signal to mitigate any effects of phase disturbance to the complex modulated optical signal and to determine information encoded in the complex modulated optical signal.

In some embodiments, the method further comprises focusing free space transmitted complex modulated optical signal into the waveguide.

In some embodiments, the method further comprises locating the optical resonator remotely from an input to the receiver so that complex modulated optical signal can be demodulated remotely from the input to the receiver.

In some embodiments, the method further comprises focusing the intensity modulated optical signal to the detector. In some embodiments, the light output from the optical detector is focused to a multimode fiber which is focused to a detector for detection and conversion of the signal output from the Etalon.

In some embodiments, the method further comprises amplifying the complex modulated optical signal.

In some embodiments, transmitting comprises transmitting through the waveguide over a distance of at least 10 meters.

In some embodiments, the method further comprises determining a phase variation in the received optical signal based on an intensity variation in the combined output optical signal energy.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
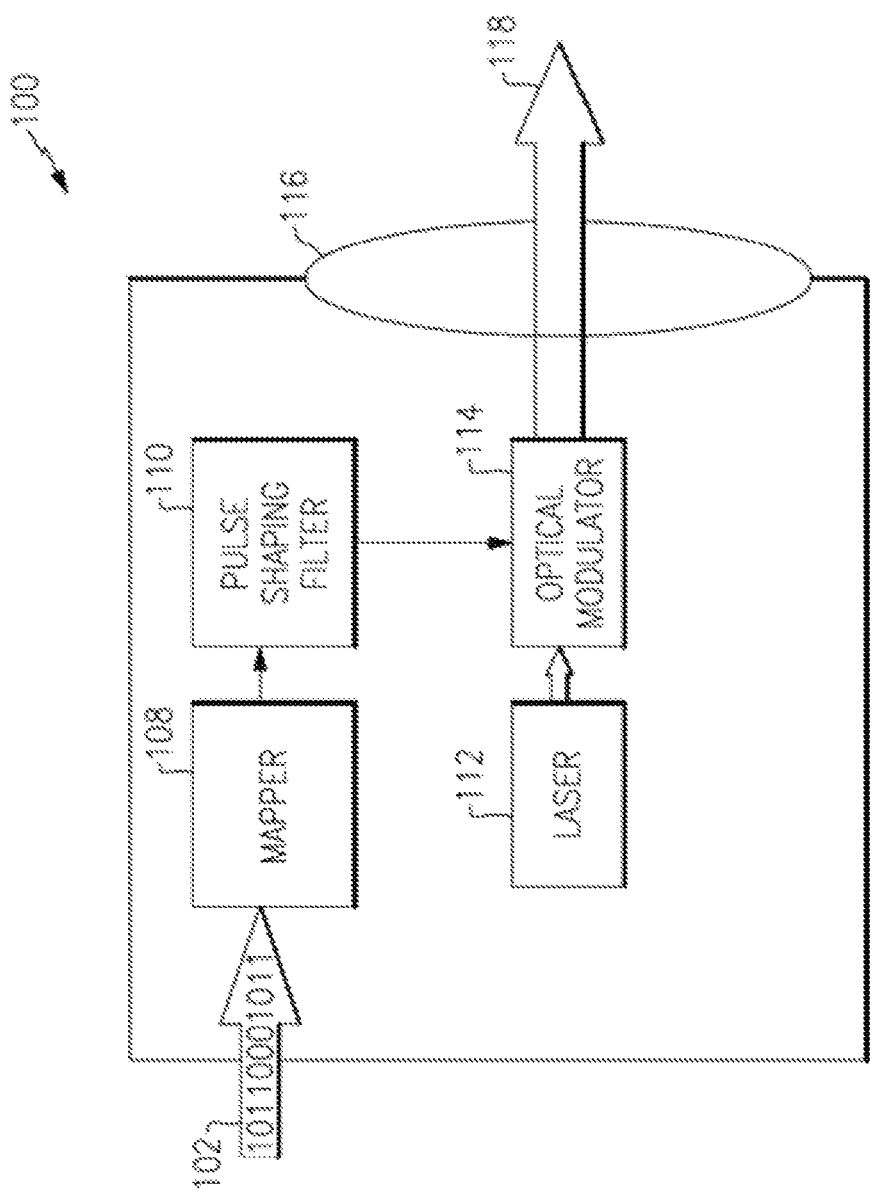
FIG. 1 is a block diagram of an optical transmitter for use with various examples described herein.

High bit rate approaches to free space optical communication often use a phase-shift keying modulation format, in part because it allows improvement in signal-to-noise ratio (SNR), typically on the order of 2-3 dB, as compared to direct detection of intensity modulations. Complex modulation is often used because it can give an improvement of up to 3 dB in sensitivity when using BPSK compared to OOK. It is also preferred to intensity modulation because it allows for improved spectral efficiency, which can increase information capacity. Because information is encoded in the phase of the optical signal(s), wavefront aberrations (e.g., variations) on the order of a fraction of a wavelength can cause significant distortion when such optical signals are focused, e.g., for coupling into an optical fiber. Traditionally wavefront correction has been used to remove aberrations and improves focusing and coupling of the optical signal into a single mode fiber, from which the signal may be demodulated by any number of coherent techniques. In these cases, adaptive optics (AO) are conventionally used to perform wavefront correction. For example, AO may utilize a deformable mirror surface with any number of wavefront sensors, such as a Shack-Hartmann sensor or a self-referencing interferometer. With feedback control, such systems can correct deviations of several microns at a rate of thousands of corrections per second. But such systems are expensive, complex, and fragile.

Traditionally for fiber and free-space optical communication, single mode fiber has been used exclusively for transporting complex, e.g., phase modulated, optical signals and adaptive optics systems are used to correct for wavefront distortion so that the incoming signal can be coupled to single mode fiber for demodulation.

Such traditional optical signal detection systems for complex optical signals typically either measure the optical phase with an optical mixer with respect to a local oscillator, or with respect to the signal itself. In neither of these cases would a multimode waveguide work for transporting the complex optical signal. In the first case, the many-modes provided by a multimode waveguide would present a complex modulated optical signal with many different relative phases compared to the local oscillator, which would also acquire different phases and intensity in the mixing process, rendering such a measurement useless, and giving approximately equal output from the two ports of the mixer before and after a phase change. The alternative approach, self-mixing, requires that the path length for all modes be the same, but that situation explicitly does not hold in multi-mode waveguide, where modal dispersion gives each mode a different propagation constant. As a result, one could not verify that the phase coherence was maintained in multi-mode waveguide.

If a free space optical signal is injected into a multimode waveguide (e.g., a multimode optical fiber), the fiber introduces very large dispersions that are added to the wavefront perturbations that are acquired on the way from transmitter to receiver. Thus, the concept of a phase of the light signal in the multimode waveguide simply does not exist; each mode has its own phase that is different from the phase of the other modes. Thus, conventional receivers that measure (or compare) phase before the phase transition with the phase after the phase transition will fail because there is no unique phase to measure.

It is appreciated by the current disclosure any optical resonator or delay line device that combines a fraction of an incoming optical beam with a delayed version of the same optical beam can be configured to act as a PM to IM demodulator. Examples of such an optical resonator or delay line devices include Fabry-Perot Etalons, bulk cavity resonators or other types of optical resonators (herein "optical resonators"). It is appreciated by the current disclosure that the properties of any such optical resonator device can be taken advantage of to pair the optical resonator with a multimode waveguide to receive and demodulate complex modulated optical signals without having to account for phase deviations in the signal provided by the multimode waveguide and/or free space transmission. In particular, even if the multiple modes in a multimode waveguide introduce phase deviations that interfere with each other, the phase changes need not be mitigated or accounted for. Instead, the properties of the optical resonator are taken advantage of to effectively average the phase deviations or phase differences of the multiple modes of the optical signal from the multimode waveguide. In particular, the average change in the phase is converted to intensity by the etalon and has no or minimal effect on the demodulation of the complex modulated optical signals.

An etalon (aka, resonator) is a linear device; its output is equal to the sum of outputs from each of the components of the input signal. The etalon converts multiple phase modulated signals into intensity modulated signals in the optical domain during the phase transition itself. The phase transitions of each of the modes take place independently of phase transitions in other modes. Thus, if the etalon/resonator is configured properly, the output that results from a wavefront distorted signal after a phase transition is the sum of intensity modulated signals generated by each of the modes. If the dispersion is small enough so that the delay between modes is smaller than the time between symbols, the total intensity modulated signal will identify the phase transition.

A unique phase of an optical signal for a given cross-section of a multimode waveguide does not exist. However, each mode has a phase that is well defined. In a phase modulated signal transmitted by a multimode waveguide, each mode will reach the optical resonator after traveling L/vm, where L is the fiber length and vm is the group velocity of the mode m. The Etalon or optical resonator being a linear device will convert each of these changes independently into changes of amplitude/intensity. If the difference of these times of arrival is smaller than the time between the underlying symbols of the modulated signal, the detector will effectively sum all individual peaks and detect the overall peak that corresponds to phase transition. There are also techniques that permit recovery of the values of original phase transitions even if the difference of times of arrival is larger than the time between two subsequent symbols.

Conventional receivers measure phase at a given cross-section and compare it to the phase measured one symbol earlier. However, since phase in a cross-section of a multi-mode waveguide is not defined, conventional receivers fail in using multimode waveguides.

An Etalon or optical receiver converts change of phase into change of amplitude/intensity while the change takes place. Since the rate of phase change and magnitude of phase change is nearly the same for all modes at the surface of the etalon, all modes in the multimode waveguide produce a nearly identical amplitude/intensity modulated signal. Thus, while a unique phase of light does not exist for an aggregations of multiple modes of light in a multimode waveguide at a given cross-section; nevertheless the change or deviations of phase that takes place across the many modes can be converted to an IM signal for direct detection purposes.

According to aspects and embodiments of the disclosure, it is appreciated that using an optical resonator as a phase-change to intensity-change converter, as in various examples disclosed herein, alleviates these problems inherent in the transport of complex optical signals through multimode waveguide. Even if the multiple modes in the fiber interfere with each other and are effectively averaged, upon a phase change, that average phase change is impacted by the full phase change of the modulated signal. The overall change in the phase of the complex modulated signal is converted to an intensity modulation by the etalon. While the relative phase of the individual propagation modes carrying the complex modulated signal will change in time, that change in phase is very slow compared to the phase change in a high-speed communications signal. As a result, the multimode waveguide and the atmosphere (in free space optical communication) appear 'frozen' and allow the average phase across all modes for one data bit to be completely coherent with the average phase across all modes for the subsequent bit. Therefore, if there is a phase shift from bit to bit, that phase shift would be converted by the etalon and directly detectable in intensity, as if the multimodal mixing were not present.

Various aspects and embodiments are directed to improved systems and methods for the transmission and demodulation of complex optical signals, including phase-encoded (i.e., phase modulated) optical signals, that accommodate wavefront aberrations and therefore do not require conventional wavefront correction. In certain examples, the system includes an optical resonator, such as a Fabry-Perot resonator, which converts a phase-encoded optical signal received from a multi-mode waveguide into an intensity modulated output signal. Aspects and embodiments are directed to receivers that include such an optical resonator as a converter element, that allows for and is operable in the presence of wavefront variation introduced by either one or both of a multimode waveguide and free space transmission.

Various examples disclosed herein include optical receivers that account for phase change in a complex modulated optical signal while this change is taking place. Conventional phase modulation receivers measure the phase before and after the transition has taken place and calculate the difference. Examples of receivers and transmission systems disclosed herein convert phase modulation into intensity modulation in the optical domain before the light is converted into electrical signal. The change in intensity modulation of the optical signal is related to the magnitude of phase change of the complex modulated optical signal. A photodiode or other form of optical sensor inside the receiver detects this intensity modulated light.

Thus, if an optical signal has several light modes that change phase nearly simultaneously, examples of receivers disclosed herein will convert each mode into nearly the same intensity modulated signal. The intensity modulated optical signal will be the sum of a running weighted average of the combined optical intensity modulated signals of the individual modes and the detected signal provided by the optical detector will be a sum all of them. For free space optical signals and for signal transmitted by the multi-mode waveguide, the summed average signal has the effect that the wavefront distortions do not interfere with detector performance.

By using an etalon for demodulation of a distorted wavefront of a complex modulated optical signal in an optical receiver, the need for single mode fiber for transmission of complex modulated optical signals, along with all of the constraints and complexities associated with it is eliminated. A multimode waveguide can be used instead. In some embodiments disclosed herein, the multimode waveguide may be any of a step index fiber, a graded multimode fiber, or a spatial division multiplex multimode fiber. As a result, design tolerances can be relaxed. Adaptive optics systems are no longer needed at the collection aperture, and in-fact, are not needed at all. Instead, the coherent optical signal can be coupled, without wavefront correction, directly to a multimode waveguide which has an area in a beam propagation direction that is ~100× greater than the area of a single mode fiber. The light can then be propagated, without significant loss in the encoded information through the multimode waveguide to a non-local destination, for example, 10 meters or more away, where it can be converted to a directly detectable signal using a bulk optical cavity optical resonator, such as a Fabry-Perot Etalon, or other types of optical resonator.

The use of multimode waveguides for the propagation of complex modulated optical signals provides several additional advantages over the use of single mode fibers. In some instances, multimode fibers may have been previously installed in buildings or vehicles, for example, airplanes for the transmission of non-complex modulated optical signals. Embodiments disclosed herein may provide for these pre-existing installations to be upgraded to transmit a greater amount of information via complex modulated optical signals without a need to retrofit the installations to include single mode optical fibers and associated equipment. Further, by removing the need for precision adaptive optics, local oscillators, Fiber Bragg Gratings (FBG), and/or delay line interferometers (DLI), etc. as used in various previous systems for transmitting and receiving complex modulated optical signals, embodiments presented herein are much less complex, more versatile and less costly.

As discussed above, atmospheric perturbations or propagation through multimode optical fiber tends to erode and ultimately destroy the spatial coherence of an optical signal. Conventional approaches of adaptive optics to compensate for any wavefront variation have several disadvantages, including large size and weight. Aspects and embodiments in accord with those discussed herein accommodate wavefront or phase distortion, without direct correction, by providing an optical resonator having regions that act on an optical signal substantially independent of adjacent and/or other regions of the optical resonator, such that wavefront or phase aberrations do not cause significant loss of signal fidelity. The optical resonator converts phase encoded information in the optical signal, at various regions of the resonator, into intensity-encoded information at an output optical signal. After phase changes have been converted to intensity variations by various regions of the etalon, the output optical signal may be focused onto a detector either through a multimode fiber or free space for conversion to a detected signal Complex modulated optical signals may come from numerous sources and/or be generated by numerous processes. Detection of the complex modulation may therefore be useful for many purposes. A coherent optical signal, such as a laser beam, may be purposefully modulated by a data communications transmitter for instance, to encode communicated information on the optical signal. Numerous processes may modulate a coherent light source, and from which information about the process may be recovered by appropriate demodulation (e.g., interpreting) of the complex modulated optical signal. In various examples, an optical signal may arrive via a free space signal path (e.g., free space optical, FSO) or a multimode waveguide or other optical waveguide system. Systems and method for demodulation of complex modulated optical signals in accord with aspects and examples disclosed herein may be beneficially applied to receive, detect, recover, etc. useful information from an optical signal having complex modulation encoding. Systems and method for demodulation of LIDAR phase modulated optical signals in accord with aspects and examples disclosed herein may be beneficially applied to receive, detect, recover, etc. useful information from a LIDAR optical signal having phase modulated optical signals.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

For the purposes of this disclosure, and as will be understood by those of skill in the art, the terms light, light signal, laser beam and optical signal may be used interchangeably herein and refer generally to an electromagnetic signal that propagates through a given medium, which may be empty space, e.g., a vacuum, or may be an atmospheric, e.g., air, or other medium, such as fiber (including multimode fiber) or other optics components. The terms light, light signal, and optical signal are not meant to imply any particular characteristic of the light, such as frequency or wavelength, band, coherency, spectral density, quality factor, etc., and may include radio waves, microwaves, infrared, visible, and/or ultraviolet electromagnetic radiation, or other electromagnetic radiation conventionally processed in the field of optics.

Many optical receivers (e.g., coherent receivers) require a stable clock to accurately perform demodulation processes for a received signal, and may also require sophisticated optics such as 90-degree hybrids, phase shifters, local oscillators and the like, especially when modulation includes encoding of information in polarization of the optical signal. In contrast, optical receivers in accord with the aspects and examples disclosed herein do not require significant optical components to achieve the same receiver capabilities as a conventional optical receiver. The benefits are achieved, at least in part, by an optical front-end that includes an optical resonator capable of detecting modulation transitions, such as phase variations, without a coherent reference source. The optical resonator further transforms the modulation, e.g., phase modulation, into an intensity modulation that allows simplified processing, potentially in the electrical domain.

Figure 2:
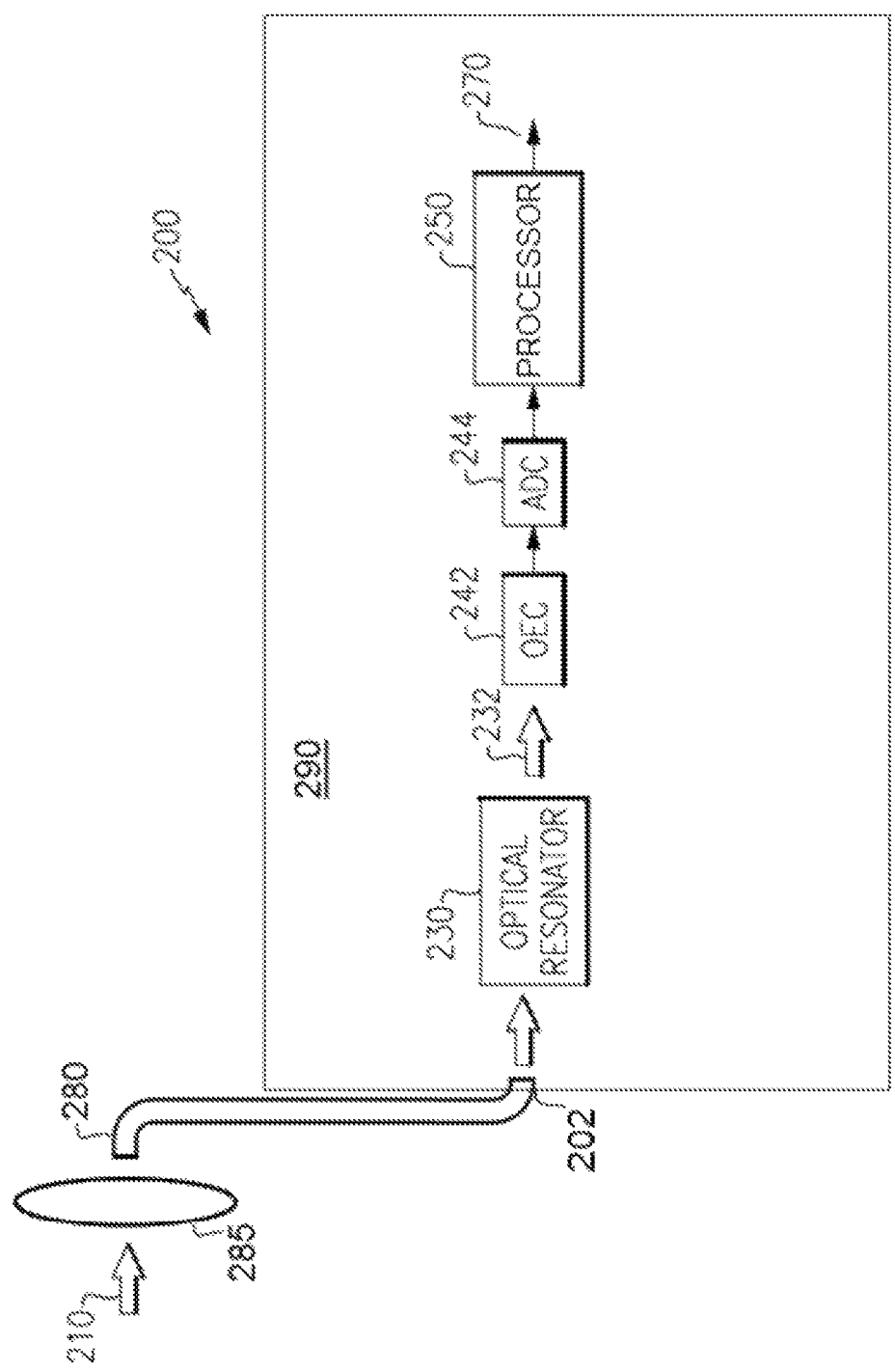
FIG. 2 is a block diagram of an optical receiver according to various examples described herein.

A functional block diagram of one example of a transmitter (e.g., optical transmitter 100) is illustrated in FIG. 1, and a functional block diagram of one example of a receiver (e.g., optical receiver 200) is illustrated in FIG. 2. The transmitter illustrated in FIG. 1 may be combined with the receiver illustrated in FIG. 2 to provide an example of a communication system, as will be readily apparent to one of ordinary skill in the art given the benefit of this disclosure.

Though the components of the example optical transmitter 100 shown in FIG. 1 and the optical receiver 200 shown in FIG. 2 may be shown and described as discrete elements in a block diagram, and may be referred to as "module", "circuitry", or "circuit," unless otherwise indicated, the components may be implemented as one of, or a combination of, analog circuitry, digital circuitry, or one or more microprocessors executing software instructions (e.g., predefined routines). In particular, the software instructions may include digital signal processing (DSP) instructions. Unless otherwise indicated, such as in the case of a multi-mode waveguide, signal lines between components of the optical transmitter 100 and components of the optical receiver 200 may be implemented as discrete analog, digital, or optical signal lines. Some of the processing operations may be expressed in terms of calculations or determinations by the optical transmitter 100, the optical receiver 200, a controller, or other components. The equivalent of calculating and determining values, or other elements, can be performed by any suitable analog or digital signal processing techniques and are included within the scope of this disclosure. Unless otherwise indicated, control signals may be encoded in either digital or analog form.

Referring to FIG. 1, one example of an optical transmitter 100 may include a data signal 102 source or input to receive the data signal 102, a mapping module 108, a pulse-shaping filter 110, an optical source (e.g., a laser) 112, a modulator 114, optics 116, and an output 118 to provide an optical signal output.

The mapping module 108 receives the data 102 and maps the data to a particular modulation scheme, such as various positions of a particular phase and amplitude constellation, depending upon the types of modulation used by the transmitter, e.g., phase, amplitude, frequency, or any combination of these. A pulse-shaping filter 110 may receive output of the mapping module 108 and control the modulator 114 to impose the modulation scheme on the optical source 112 to generate a modulated optical signal. In various examples, the modulator 114 may be an electro-optic modulator, and may include the optical source 112, such as a laser. In particular, the optical source 112 may emit a continuous carrier waveform that is modulated (e.g., in phase, amplitude, and/or frequency) for each symbol of the data to encode those symbols on the carrier waveform. The transmitter 100 may also include various optics 116 such as one or more mirrors or lenses to direct the optical signal at the output 118. The output 118 may direct the optical signal into free space or directly into a waveguide, for example, a multimode waveguide.

Referring to FIG. 2, illustrated is an example of an optical receiver 200 according to various examples discussed herein. FIG. 2 is described with continuing reference to the optical transmitter 100 of FIG. 1, which may communicate data to the optical receiver 200. Additionally, a receiver and a transmitter may be paired together, e.g., to form a transceiver, capable of bidirectional data communication with another transmitter/receiver pair.

The illustrated receiver 200 has an input 202 that receives an optical signal 210. The optical signal may be received from free space or from a waveguide, for example, a multimode waveguide. For example, FIG. 2 illustrates a receiver 200 in which the optical signal 210 is received by a multimode waveguide 280, optionally after being transmitted via free space and focused onto an input of the multimode waveguide 280 by a lens 285 or other optical assembly or directly transmitted by the transmitter by the multimode waveguide 280. The receiver 200 may be remote from the input 202 and the optical signal 210 may be carried through the multimode waveguide 280 into a remote area 290, for example, a temperature controlled or otherwise environmentally controlled region housing the other portions of the receiver 200. In some embodiment, the multimode waveguide 280 itself is not a part of the receiver, but rather just the channel/medium (or portion thereof) transporting the complex optical signal 210. However, the receiver 200 (or the optical resonator 230) is configured to receive the optical signal 210 from the multimode waveguide 280.

The receiver 200 includes an optical resonator 230 and a processor or digital processing subsystem 250 that provides an output 270. The optical resonator 230 may be coupled to the processor or digital processing subsystem 250 by an optical-electrical converter 242 and an analog to digital converter 244, for example.

Examples of optical resonators 230 include Fabry-Perot etalons, bulk cavity optical resonators, or other types of optical resonators. The optical resonator 230 is a component capable of sensing transitions, such as phase variations, representative of modulation performed at the transmitter, and transforming the transitions into intensity modulation of an output optical signal, e.g., output optical signal 232. The optical resonator 230 converts the modulation of the arriving optical signal 210 in part by interaction of the arriving optical signal 210 with resonant optical energy built-up in the optical resonator 230.

For example, an etalon is a component having semi-reflective surfaces that may include a transparent material in between, and has one or more characteristic resonant frequencies, each associated with a certain wavelength of light, based upon the spacing (i.e., optical length) between the semi-reflective surfaces. The surfaces are semi-reflective and also semi-transmissive, in that they allow some light through, and therefore the arriving optical signal 210 may be allowed into the etalon and may resonate inside the etalon (i.e., between the two semi-reflective surfaces). Additionally, some of the light resonating inside is allowed out of the etalon (through the semi-transmissive surface). Light emerging from the etalon is shown, for example, as the optical signal 232 in FIG. 2.

An optical signal received by an optical resonator 230, an etalon in this example, may establish a steady-state condition in which optical signal energy continuously arrives at the etalon, accumulates or adds to built-up resonating energy existing inside the etalon, and emerges from the etalon at a constant rate. A change in the arriving phase, frequency, or amplitude of the optical signal may disrupt the resonance inside the etalon, and the light intensity emerging from the etalon is also disrupted, until a steady state condition is re-established. Accordingly, a change in phase, frequency, or amplitude of the arriving optical signal 210 causes a change in intensity of the emerging optical signal 232. A large phase transition in the arriving optical signal 210, for example, causes a large (but temporary) intensity change in the emerging optical signal 232. Accordingly, an optical resonator 230 functions as a demodulator, or a modulation converter, for an optical signal 210. The emerging optical signal 232 may therefore carry the same information content as the arriving optical signal 210, but in intensity modulated form.

The emerging intensity-modulated optical signal 232 may be converted to an electrical signal by an optical-electrical converter, e.g., OEC 242, which may include a photodetector, such as a photodiode, for example. Accordingly, the output of the OEC 242 may be an amplitude modulated signal representative of the intensity-modulated optical signal 232 and may be converted to a digital form by an analog to digital converter, e.g., ADC 244. The digital signal is provided to the digital processing subsystem 250 for digital processing. The digital processing subsystem 250 processes the digital signal to receive the information-carrying content of the optical signal 210. The basic operation of the digital processing subsystem 250 is known in the art.

In various examples, a receiver in accord with aspects and examples disclosed herein may include additional or fewer optics than discussed above and may omit or add various components relative to those discussed above. For example, focusing optics may be included to receive the emerging optical signal 232 from the optical resonator 230 and to focus the optical signal 232 either on the OEC 242 or to a multimode fiber (not illustrated) to deliver to the OEC 242. Certain examples may use analog receiver circuitry and therefore may omit one or more of the ADCs 224.

Figure 3:
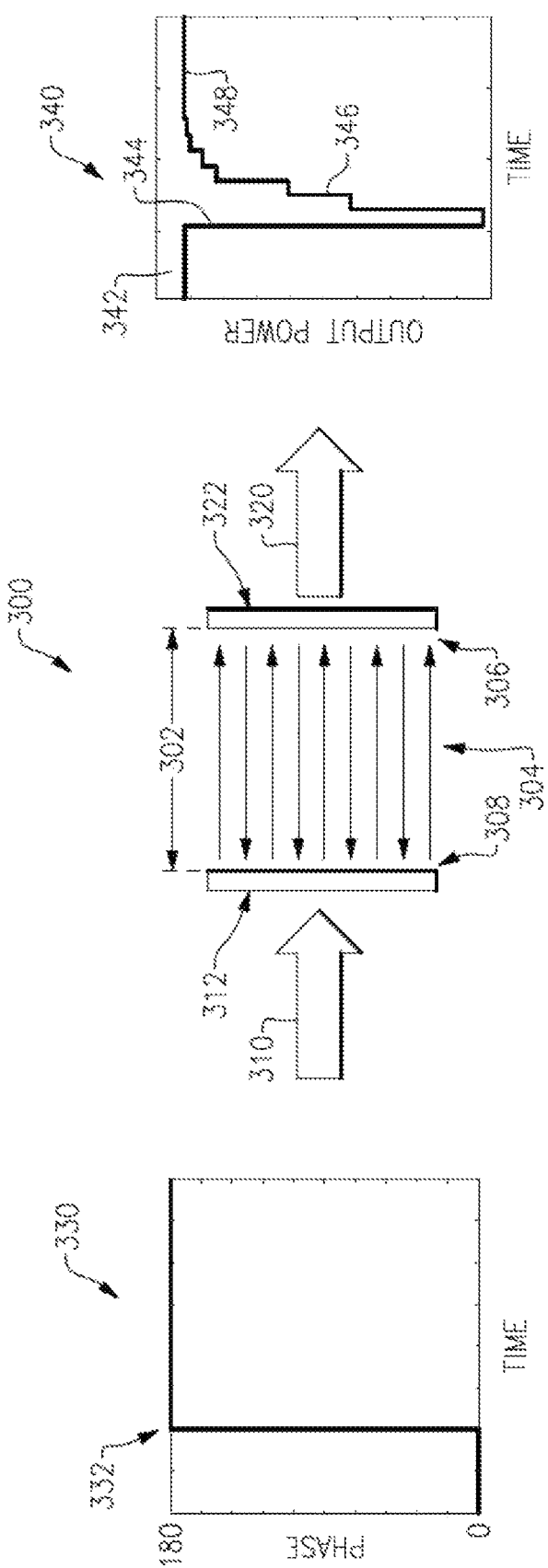
FIG. 3 is a schematic diagram of an example of an optical resonator, including a graph of received signal phase and a graph of output intensity of the optical resonator.

As discussed above, suitable optical resonators include etalons, and at least one example of an etalon is discussed with respect to FIG. 3, which illustrates an example of an etalon 300 which may be used in various examples of a receiver in accord with aspects and embodiments described herein, for example, as the optical resonator 230 in FIG. 2. In particular, a receiver may use the etalon 300 to convert complex signal modulations of a received optical communication signal 310 into intensity or amplitude modulations of an output optical signal 320. The intensity or amplitude modulated output optical signal 320 may then be converted to an electrical signal, with corresponding amplitude variations representative of the modulation of the received optical signal 310. The etalon 300 causes the received optical signal 310 to resonantly interact with itself, internal to the etalon 300, such that changes in the received optical signal 310 disrupt the resonance and cause amplitude (or intensity) variations at the output optical signal 320, which may be coupled directly to a detector.

In particular examples, the etalon 300 is designed to have a resonant frequency aligned with the source, e.g., a transmit laser, of the received optical communication signal 310. In various examples, a dimensional scale, e.g., length 302, of the etalon 300 is selected such that the etalon 300 exhibits optical resonance at the wavelength of the received optical communication signal 310. In certain examples, such dimensional scales are much shorter than the length of a transmitted symbol, which is the distance traveled by the optical signal between transitions that convey information, e.g., between phase changes in a phase modulated signal.

The etalon 300 includes an interior 304 with semi-reflective surfaces 306, 308 that reflect optical signal energy into the interior 304. An input side 312 allows optical signal energy, such as the optical communication signal 310, into the interior 304. The input side 312 thereby forms an aperture through which the arriving optical communication signal 310 is received. An output side 322 forms an optical output, at least in part by action of the semi-reflective surface 306 to allow a portion of trapped optical signal energy from the interior 304 to emerge as an output optical signal, such as the output optical signal 320. According to some aspects and embodiments the light provided at both the front and back surface of the Etalon are collected as an output of the etalon and provided as output intensity modulated signals of the phase modulated input signals. Accordingly, the semi-reflective surface 306 is also semi-transmissive, such that optical signal energy arriving (from the interior 304) at the semi-reflective surface 306 is partially reflected back to the interior 304 and partially transmitted through to the output side 322. The etalon 300 may have varying levels of reflectivity of the semi-reflective surfaces 306, 308. In certain examples, the reflectivity may be expressed as a fraction of light amplitude reflected back into the interior 304 or may be expressed as a fraction of light intensity reflected back into the interior 304. In an example, an amplitude reflectivity of the first semi-reflective surface 308 may be $r_1=0.999$ and an amplitude reflectivity of the second semi-reflective surface 306 may be $r_2=0.985$. In other examples the reflectivity of each of the first and second semi-reflective surfaces may be different and may be any suitable value for a particular implementation. The etalon 300 is one example of a suitable optical resonator in accord with aspects and embodiments described herein.

According to certain examples, an optical resonator, such as the etalon 300, will coherently develop an output signal based on the input signal, and maintain a given level of the output signal until a modulation in the phase of the input signal occurs. When a phase modulation occurs in the input signal, destructive interference causes a phase-dependent change in the amplitude of the output signal. This can be seen in the input phase plot 330 and the output power plot 340 illustrated in FIG. 3. Accordingly, a received phase encoded optical communication signal, such as received optical signal 310, is converted to an amplitude varying signal, such as the output optical signal 320, by the optical resonator, such as the etalon 300. The output optical signal 320 is suitable for direct detection by a sensor, such as the OEC 242 of FIG. 2. Additionally, an optical resonator will function over a broad range of data rates without the need to modify the optical characteristics of the system, such as detector setup, path length adjustments, delay elements, or the like. For example, the ability of the etalon 300 to convert an arriving phase modulated input optical signal 310 into an intensity modulated output optical signal 320 may be independent of the modulation rate at which the input phase is changing. For example, an output of an etalon construction is based on the magnitude and rate of phase change (dphi/dt), but independent of the data rate itself (symbols per second), as long as the steady state condition is achieved before the phase is changed again.

The use of the term "etalon" throughout this disclosure is not intended to be limiting and as used herein may include any of multiple structures, including plates with reflecting surfaces as well as parallel mirrors with various materials in between, and may also be referred to as cavities, interferometers, and the like. Additionally, etalon structures may be formed as a laminate, layer, film, coating, or the like.

FIG. 3 further illustrates operation of the etalon 300 with reference to the output power plot 340 of optical signal intensity (as output power) emerging from an optical resonator, such as the etalon 300, during a phase transition 332 in the received optical signal 310. At point 342 the etalon 300 is in a steady-state resonance condition wherein a steady intensity of light emerges. At point 344 a phase transition 332 occurs in the arriving optical signal 310, temporarily disrupting the steady-state and causing a change in the emerging light intensity. During successive reflections inside the etalon, labeled at point 346, resonance is being re-established and the emerging light intensity increases until, at point 348, a steady intensity of light emerges when the etalon 300 has returned to a steady-state condition.

Accordingly, variation in emerging light intensity from an optical resonator, such as the etalon 300, indicates that a transition occurred in an arriving optical signal, such as a phase, frequency, or amplitude variation, and such may be used by appropriate signal processing to determine useful information by analyzing the emerging light intensity. In the example discussed above and illustrated by FIG. 3, the arriving optical signal 310 is presumed to be phase modulated, but other examples include frequency or amplitude modulation, or any combination of these, and may cause similar variations or other detectable variations in output intensity. In some examples, higher order or more complex modulation may be accommodated by various optical resonator designs.

As an example, an etalon tuned to the arriving wavelength reacts to a phase variation in the arriving optical signal in accord with the discussion above and as illustrated in FIG. 3. If the arriving optical signal is modulated with binary phase shift keying (BPSK), for example, the output illustrated in FIG. 3 indicates each phase shift, and accordingly the information carried in the phase shift keying may be recovered from the intensity variations at the output optical signal 320. It should be understood by those of skill in the art with the benefit of this disclosure, that such information recovery is achieved without the necessity for a local coherent clock source or the need to support single-mode coupling, such as to a single mode fiber and delay-line interferometer, to demodulate the arriving optical signal.

In some examples, an etalon may include reflective surfaces (including semi-reflective surfaces) that are not co-planar and/or are not co-linear. For example, an interior reflective surface of an etalon may include some curvature, and an opposing surface may also be curved such that a distance between the two surfaces is substantially constant across various regions of the etalon, in some examples. In other examples, an etalon may have non-linear or non-planar surfaces with varying distances between the surfaces at various regions, and may still function as an optical resonator for various wavelengths and at various regions, suitable for use in examples discussed herein. Accordingly, an etalon may be purposefully designed to conform to a surface, or to have various regions responsive to differing wavelengths, or responsive to differing angles of arrival for a given wavelength, in certain examples.

Figure 4:
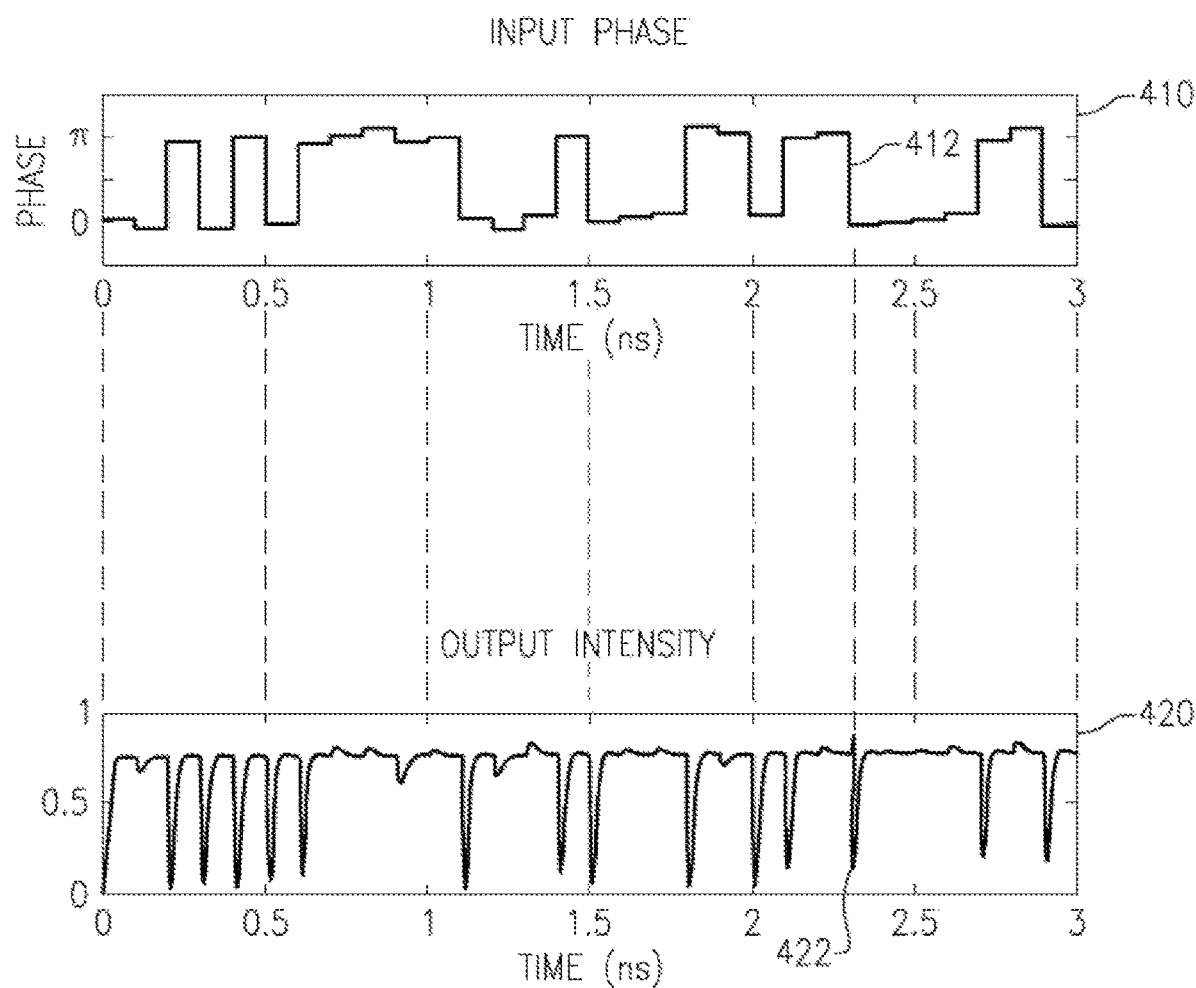
FIG. 4 is a graph of optical input phase and output intensity from an example of the optical resonator of FIG. 3.

FIG. 4 illustrates a plot 410 of varying phase of a received phase modulated optical signal, and a plot 420 of the resulting intensity of an output optical signal, from an optical resonator such as the etalon 300. The results shown in FIG. 4 are for an etalon having a length of 18 μm and with reflectance of 0.999 at the semi-reflective surface 308 and reflectance of 0.985 at the semi-reflective surface 306. The otherwise continuous input phase (shown in the plot 410) changes at intervals according to the modulated information content, and the plot 410 can be seen as a sequence of binary data, such as high and low bits corresponding to ones and zeros, for example. Among the multiple phase transitions shown in the plot 410, a phase transition 412 is specifically associated with a change 422 in output intensity, shown in the plot 420. Each phase variation in the received optical signal causes a respective change in the output intensity. Accordingly, a receiver can track the changes in output intensity and thereby recover the information content of the received phase modulated optical signal.

Optical resonators, such as etalons, used to demodulate or convert optical signal modulations into intensity modulated output signals, as discussed herein, may be manufactured with significant aperture area to receive light signals, and may receive and operate on received light across a large aperture, such that portions of the light in one region of the aperture area may have varying phase relationship to other portions of the light received at other regions of the aperture area. The portions of light received at various regions may be operated on by the etalon essentially independently of each other. Light received at a first region of the etalon's aperture may be converted to intensity variations at an associated first output region, and light received at a second region of the aperture may be independently converted to intensity variations at an associated second output region, without interaction of the relative phases of the light arriving at each region. Accordingly, wavefront correction may not be required for detection and demodulation. Phase or other variations in any number of differing regions of the etalon's aperture may be simultaneously detected and converted into output intensity modulations at each of a respective output region. Such may be beneficial when the optical signal arriving at a receiver has propagated through a medium that causes wavefront variation, as described in more detail with respect to FIGS. 5A and 5B.

Figure 5A:
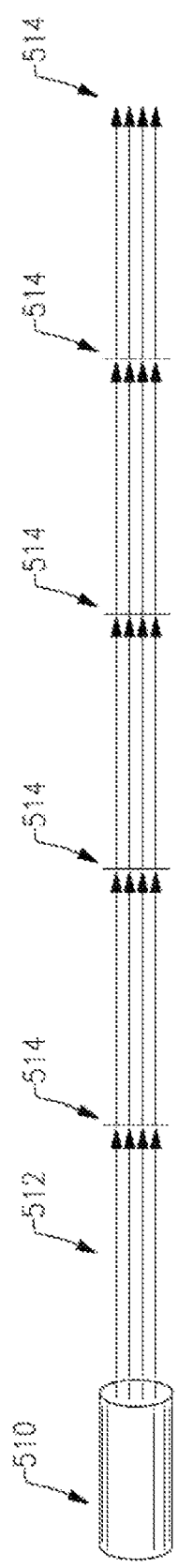
FIGS. 5A-5B are schematic diagrams of examples of light ray propagation.

FIG. 5A illustrates the propagation of coherent light under ideal conditions, without experiencing aberrations due to an atmospheric condition, imperfection, or contamination in the medium through which the light travels, for example. Shown is a light source 510, such as a laser, for example, that generates a coherent light signal 512. For the purposes of the disclosure herein, coherency may be understood as phase alignment of a bundle of light rays. At a particular plane in space and time, if all the light rays have the same phase then the light is spatially coherent. If the light signal 512 does not experience any aberrations, such as imperfections, contaminants, or perturbations in the propagation medium, the light signal 512 will have wavefronts 514 that remain phase aligned, i.e., spatially coherent, as the light signal 512 propagates, e.g., from left to right in FIG. 5A.

Figure 5B:
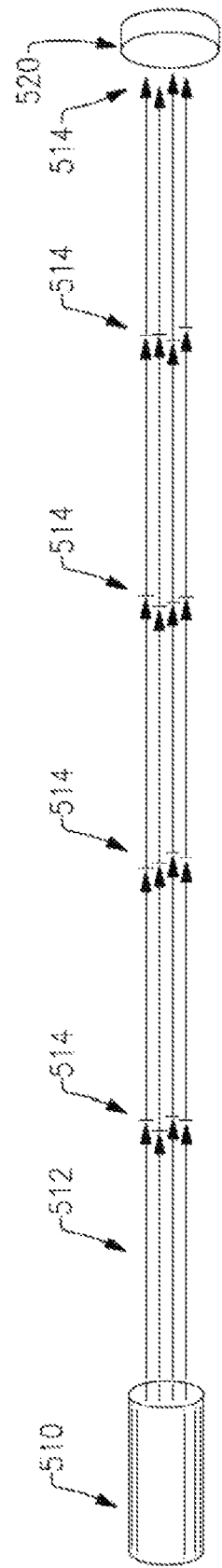

FIG. 5B illustrates the propagation of coherent light through a more realistic medium, such as air, for example, where the light may encounter aberrations such as, notably, air perturbations, or through a multimode waveguide which may distort the phase relationships in the optical signal. In FIG. 5B the light rays are influenced by air perturbations, distortion associated with propagation through a multimode waveguide, or other obstructive influences, that may affect a portion of the light signal 512 differently than adjacent portions of the light signal 512 and, accordingly, the wavefronts 514 of the light signal 512 may become mis-aligned as illustrated in FIG. 5B. If information being carried by the light signal 512 is contained in, for example, the phase of the light signal 512, a conventional optical receiver, without wavefront correction, that focuses and concentrates the rays of the light signal 512, e.g., an optic lens system, will result in a focused spot that is many times the diffraction-limited size, with regions of intensity variation that make coupling to a single mode fiber inefficient and unstable. Such a conventional optical receiver requires some form of wavefront correction to restore the phase relationship across the wavefronts 514 to improve the intensity stability and allow a reduced spot size. By contrast, with an etalon 520, each region of the face (e.g., aperture) of the etalon 520 receives a portion of the light signal 512 that may be coherent within that portion, and at least does not substantially affect portions of the light signal 512 arriving at other regions of the face of the etalon 520. Accordingly, variations in arrival times of the wavefronts at the various regions of the etalon 520 may not require correction or compensation. The output intensity at various regions of the output side of the etalon 520 may occur at different moments, differing in time on the order of magnitude of the frequency, of the light, but the overall output intensity across the back face of the etalon 520 will vary in intensity at a rate on the order of the modulation rate. Accordingly, the amplitude variations between various regions are relatively minor (e.g., in time) relative to the timing of the phase-encoded transitions (e.g., the duration of a symbol).

It is to be understood that labeling of wavefronts, e.g., wavefronts 514, in FIGS. 5A and 5B, is arbitrary. Any position in space and/or time of a light signal may be identified as a wavefront for the purpose of discussing phase alignment with respect to other space-time positions. Further, the phase relationship, or spatial coherency, of a bundle of light rays at one position in space-time may change as the bundle of light rays propagates and is influenced by the medium through which it travels. Further, alterations in phase relationship experienced by a particular bundle of light rays may not be the same as that experienced by another bundle of light rays that come before or after. Accordingly, the alignment or misalignment of arriving wavefronts may change significantly from one moment to the next, as illustrated by the varying alignment shown for each wavefront 514 in FIG. 5B.

Optical signals complex modulated to carry information have one or more characteristics that may change in either a continuous or discrete fashion, or some combination of the two, and segments of the light over time may be associated with the particular characteristic(s) that indicates the information being conveyed. For example, a phase modulated digital optical transmitter may emit coherent light of a certain phase relationship (relative to a reference time and/or phase) to indicate a particular value. The light emitted to indicate the value may be considered a segment of light, or a length of light, whose phase indicates the value. At later times, the transmitter alters the light characteristic to emit a second segment of light to indicate a second value, then again later to emit a third segment of light, then a fourth, and so on. The rate at which the transmitter discretely alters the characteristic, as in this example, is a modulation rate of the transmitter, also known as a symbol rate or baud rate Each segment of light has a physical length associated with it based upon the duration of time between transitions and the speed of light in the propagation medium. For example, a modulation rate of $10^8$ baud (100 million symbols per second) emits light segments of 10 nanosecond duration with length of approximately 3 meters (in air or vacuum). Higher modulation rates generate shorter light segments and lower modulation rates generate longer light segments. A particular phase relationship of a single light segment may represent more than a single binary digit (bit) of information, e.g., because the phase (and/or amplitude), for example, may be selected from among multiple phases (and/or amplitudes), such that the information-carrying characteristic is not a binary selection. Accordingly, baud rate, symbol rate, or modulation rate is not necessarily equal to a transmission bit rate for a transmission system. Instead, the bit rate is generally the modulation rate times the number of bits per symbol (e.g., bits per light segment).

Some optical transmission systems may alter different or additional light characteristics, such as amplitude, frequency, polarization, for instance, and may vary the modulation rate over time, e.g., based on channel characteristics, noise, error rate, and the like. Additionally, some optical systems may cause light to be modulated in an analog fashion, such as by a continuous variation in amplitude or phase of the light signal, and therefore not have a modulation rate per se. For the purposes of this disclosure, aspects and embodiments are generally described in the context of a discrete transmission system including a phase modulation, though it is to be understood that aspects and embodiments disclosed herein may be equally useful as receivers for systems that generate light signals that convey information differently than that described.

As discussed above, certain embodiments of an optical receiver system in accord with aspects disclosed herein may compensate, or accommodate, variation in wavefront arrival on a scale of a number of wavelengths. Light segments that convey a particular symbol are much longer than the wavelength of the light. Aspects and embodiments as disclosed herein operate such that the phase-varying information is converted to intensity-varying information without the need to focus to a single-mode fiber, thus eliminating the need for wavefront correction that would otherwise be necessary to achieve stable and efficient coupling.

For example, with continued reference to FIG. 5B, a wavefront 514 may have lost spatial coherency during propagation such that portions of the wavefront may have phase differences on the order of multiple wavelengths relative to other portions of the wavefront. Accordingly, a conventional optical signal receiver using optics to focus the light signal 512 may apply wavefront correction to shift portions of the light signal by a fraction of a wavelength or multiple wavelengths, requiring accuracy of a fraction of a wavelength, which may be complex and costly. In certain embodiments of an etalon-based optical receiver as disclosed herein, each region of the etalon 520 may receive only a portion of the light signal 512 and the portion received may be sufficiently spatially coherent, e.g., not having significant phase variation across the portion, that the etalon 520 region may accurately detect the phase content of the portion of the light signal 512 and convey it as intensity variations at the output, which may be combined or focused with intensity-varying light from other regions of the output to detect an overall output intensity, without the need for wavefront correction in the optical domain.

Accordingly, aspects and examples described herein provide systems and methods for demodulation of phase encoded optical signals without conventional wavefront correction. In some examples, etalon optical resonators provide phase-change to intensity-change conversion of received optical signals, including from free-space, such that accommodation of wavefront variations is significantly simplified. As described above, direct wavefront correction requires spatial corrections on the order of fractions of a wavelength (e.g., sub-microns, μm), conventionally achieved with adaptive optics, whereas aspects and embodiments disclosed herein eliminate the need for such systems.

Aspects and embodiments disclosed herein can tolerate wavefront distortion on the order of dozens of wavelengths or more. Further, aspects and embodiments disclosed herein may operate on free-space optical signals or optical signals propagated through multimode waveguides, eliminating the need to couple light into a single mode fiber. Additionally, an etalon may be tuned to resonance of the wavelength of an optical signal, independent of modulation or communication rates, and therefore function over a broad range of information rates without the need to modify the characteristics of the receiver.

Thus, it is appreciated by the current disclosure that the properties of an optical resonator allows the optical resonator to be paired with a multimode waveguide to receive and demodulate complex modulated optical signals without having to account for phase deviations in the signal provided by the multimode waveguide and/or free-space transmission. In particular, even if the multi modes in a multimode waveguide introduce different phase deviations, the phase changes need not be mitigated or accounted for. Instead, the properties of the optical resonator are being taken advantage of to effectively average the phase deviations or phase differences of the multimode of the optical signal from the waveguide. In particular, the average change in the phase is converted to intensity by the etalon and have no effect on the demodulation of the complex modulated optical signals.

Advantages of the aspects and embodiments described herein are numerous. For example, optical components may be lower cost or less complex than those required for conventional systems, such as allowing for coated or uncoated glass rather than crystal or expensive coatings. Use of optical resonators, such as etalons, for converting phase modulation into intensity modulation, may be advantageously designed to incorporate filtering (e.g., rejection of unwanted signals, via resonant dimensions, for example) which may provide improved signal-to-noise characteristics. Aspects and embodiments in accord with those described herein may satisfactorily operate in extreme aberration or turbulence in which adaptive optics would fail. Further, aspects and embodiments in accord with those described herein may achieve free-space optical communications with low size, weight, power, and cost requirements, improving support for platforms such as unmanned aerial vehicles and microsatellites.

Various embodiments may have various etalon dimensions and tolerances based upon design criteria and to accommodate varying operational characteristics. In some examples, various etalon dimensions and tolerances may be selected to trade off, or balance, how strongly and/or how quickly the etalon responds to transitions in an arriving optical signal, such as phase transitions associated with phase modulation, and how quickly the etalon approaches a return to steady-state after a transition. Additionally, various etalon dimensions and tolerances may be selected to optimize a receiver, such as the receiver 200, for a particular data rate and/or a particular wavelength.

Various dimensions of an optical resonator in accord with aspects and examples disclosed herein may be significantly smaller than a dimension associated with a baud rate or symbol length of a phase encoded optical signal. In some examples, a resonant dimension (e.g., etalon length, cavity round-trip length, etc.) may provide an effective optical length less than half the distance associated with a baud rate or symbol length. For example, a baud rate may be a rate at which modulation variations occur, and a symbol length may be the distance an optical signal travels between modulation variations.

In the case of an optical resonator, the distance the optical signal travels may be based upon the material, or optical media, from which the optical resonator is constructed. For an optical resonator (e.g., etalon) capable of storing optical signal energy and providing resonance through constructive and destructive interference, optical signal energy remains in the resonator for a greater amount of time, such that an effective optical length is greater than the resonator's physical length, i.e., optical signal energy spends more time in the resonator than if the resonator allowed the optical signal to pass through without resonantly accumulating. For a given reflectivity coating, a time until the next modulation variation (i.e., inverse of the baud rate) may be enough time for an arriving optical signal to traverse the resonant dimension of the optical resonator numerous times. In certain examples, the resonant dimension (etalon length) may provide an effective optical length one third or less of the symbol length. In some examples, the physical dimension of the etalon length may be on the order of one tenth of the symbol length or less, (e.g., depending upon the reflectivity of the etalon surfaces, for example) to provide an effective optical length of one third of the symbol length. Accordingly, in some examples, a symbol length may be as short as 10 times the physical dimension of the etalon, or less. Additionally, the symbol length may be as long as 5,000 times the physical dimension of the etalon, or more, in accord with aspects and examples being capable of accommodating a wide variety of modulation rates, as previously discussed.

Additional benefits associated with the use of an optical resonator, such as an etalon, as a front end component combined with a processing subsystem, for the reception of modulated optical signals, include flexible operation, capable of receiving signals from free space or via a multimode waveguide coupling or other optical waveguides and/or components. An optical resonator may also provide noise reduction due to rejection of optical signal energy outside the intended wavelengths, e.g., due to the resonate nature. Additionally, an optical resonator may be provided with coatings or other features to further reject undesired optical wavelengths, including alternate resonant wavelengths that are not intended to be part of the received signal. For example, a particular length (or width, depending upon perspective) of an optical component may resonate at multiple wavelengths but coatings and/or other design features may act to limit the build-up of optical signal energy at the undesired wavelengths, such as a coating that provides reduced reflectivity at alternate wavelengths, or filters integrated with or placed before the aperture of the optical resonator, or others.

Additional modulation formats may also be accommodated by design characteristics of an optical resonator. The resonant nature may respond to pulse width or other modulations in addition to purely phase transitions. For example, a pulse width modulated signal causes the signal energy trapped in the resonator to build up or approach a steady-state value, and the longer the pulse width the closer the resonator will come to, or the longer it will remain in, a steady-state signal energy condition. When the pulse ceases, the optical resonator's output will change similar in manner to a phase transition. Accordingly, amplitude and pulse width modulations of an arriving optical signal may be detected by processing the optical intensity output of the optical resonator.

Certain embodiments may incorporate various additional aspects or components to further provide selectivity of one light signal over another. For example, light of certain wavelengths may be preferred or rejected using frequency selective filters, frequency selective coatings, and/or by selection of frequency selective dimensions or other features of an optical resonator or other resonant structures.

As discussed above with reference to FIGS. 1 and 2, in various examples components of the transmitter 100 and/or receiver 200 may be implemented as one of, or a combination of, analog circuitry, digital circuitry, or one or more digital signal processors (DSP) or other microprocessors executing software instructions. Software instructions may include DSP instructions. Various aspects and functions described herein may be implemented as specialized hardware or software components executing in one or more computer systems.

Figure 6:
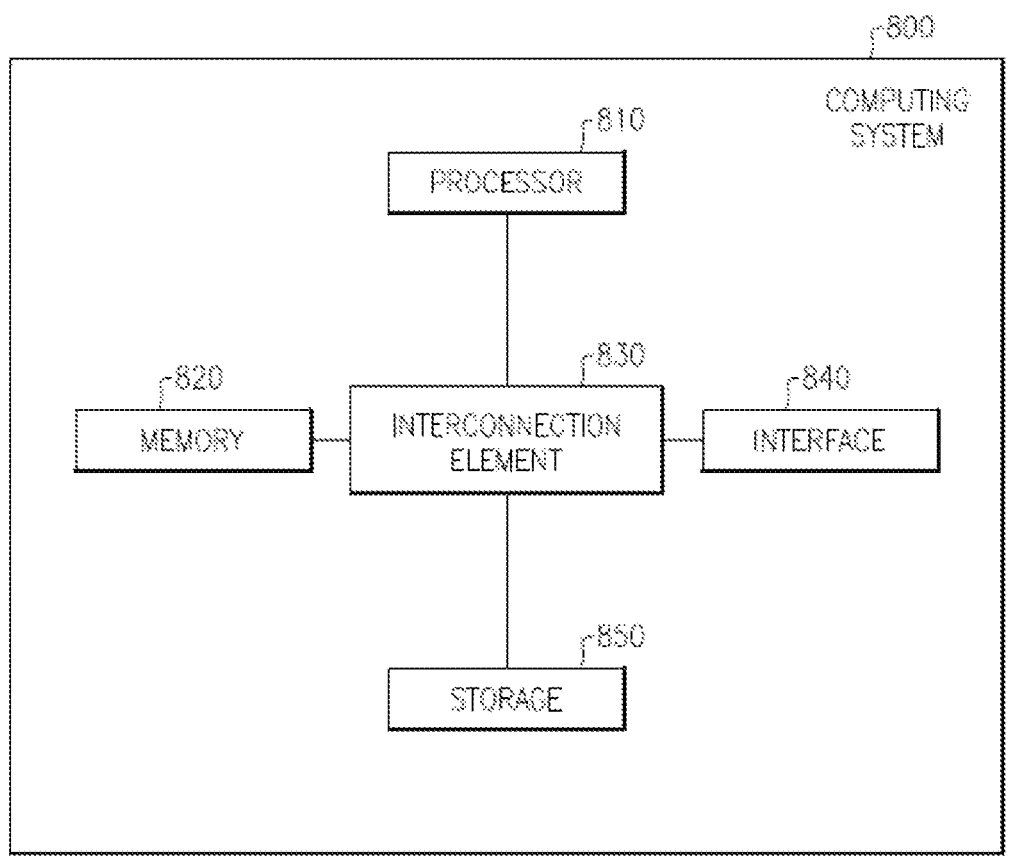
FIG. 6 is a functional block diagram of an example of a computing system that may be configured to implement various examples of the processes described herein.

FIG. 6 illustrates one example of a computing system 800 that may implement software routines corresponding to a control circuit or module, for example, the mapping module 108 as illustrated in FIG. 1, and/or other components. The computing system 800 may further implement software routines corresponding to the digital processing subsystem 250 of FIG. 2 and/or other components of a receiver 200. The computing system 800 may include a processor 810, data storage 850, a memory 820, and one or more interfaces 840, such as a system interface and/or a user interface. While not explicitly illustrated in FIG. 6, in certain examples the computing system 800 may be coupled to a power source.

The power source may deliver power to one or more components of the computing system 800, as well as other components of the optical transmitter 100 or optical receiver 200.

In FIG. 6, the processor 810 is coupled to the data storage 850, memory 820, and the various interfaces 840. The memory 820 stores programs (e.g., sequences of instructions coded to be executable by the processor 810) and data during operation of the computing system 800. Thus, the memory 820 may be a relatively high performance, volatile, random access memory such as a dynamic random-access memory ("DRAM") or static memory ("SRAM"). However, the memory 820 may include any device for storing data, such as a disk drive or other nonvolatile storage device. Various examples may organize the memory 820 into particularized and, in some cases, unique structures to perform the functions disclosed herein. These data structures may be sized and organized to store values for particular data and types of data.

The data storage 850 includes a computer readable and writeable data storage medium configured to store non-transitory instructions and other data, and can include non-volatile storage media, such as optical or magnetic disk, ROM or flash memory. The instructions may include executable programs or other code that can be executed by the at least one processor 810 to perform any of the functions described herein.

In various examples, the computing system 800 includes several interface components 840, such as a system interface and/or a user interface. Each of the interface components 840 is configured to exchange, e.g., send or receive, data with other components of the computing system 800 (and/or associated transmitter or receiver), or other devices in communication with the computing system 800. According to various examples, the interface components 840 may include hardware components, software components, or a combination of hardware and software components.

In certain examples, components of the system interface couple the processor 810 to one or more other components of the optical transmitter 100 shown in FIG. 1, or of the optical receiver 200 shown in FIG. 2. The system interface may provide one or more control signals to any such components and may manage the operation of such components, as described above.

A user interface may include hardware and/or software components that allow a corresponding transmitter or receiver in which the computing system 800 is incorporated to communicate with an external entity, such as a user. These components may be configured to receive information from user interactions with the user interface. Examples of the components that may be employed within the user interface include buttons, switches, light-emitting diodes, touch screens, displays, stored audio signals, voice recognition, or an application on a computer-enabled device in communication with the computing system 800. Data received at the various interfaces may be provided to the processor 810, as illustrated in FIG. 6. Communication coupling (e.g., shown interconnection mechanism 830) between the processor 810, memory 820, data storage 850, and interface(s) 840 may be implemented as one or more physical busses in conformance with standard, proprietary, or specialized computing bus technologies.

The processor 810 performs a series of instructions that result in manipulated data that is stored in and retrieved from the data storage 850, as discussed above. In various examples, the series of instructions result in interpretation of the outputs from optical resonators as discussed above. Such instructions may correspond to commands for interpreting peaks and troughs of such output signals to determine phase, frequency, or amplitude changes (modulations) in an arriving optical signal, and/or recovering a data payload therefrom, as discussed herein.

The processor 810 may be any type of processor, multi-processor, or controller, whether commercially available or specially manufactured. For instance, the processor may include a commercially available processor, such as a processor manufactured by INTEL, AMD, MOTOROLA, or FREESCALE. In some examples, the processor 810 may be configured to execute an operating system, such as a real-time operating system (RTOS), for instance RTLinux, or a non-real time operating system, such as BSD or GNU/Linux. The operating system may provide platform services to application software. These platform services may include inter-process and network communication, file system management and standard database manipulation. One or more of many operating systems may be used, and examples are not limited to any particular operating system or operating system characteristic.

Portions of the disclosure herein make reference to orders of magnitude of distance, e.g., length, and time, e.g., duration, of aspects of light signals, with regard to the length or duration of a segment of light or a wavelength of light. It is to be understood that distance and duration may at times be used interchangeably with respect to light and optical systems, and unless the context implies otherwise, the relationship between distance and duration with respect to light is the speed of light in the medium of propagation. For example, phase relationships are on the order of one wavelength of light, and a wavelength is directly inversely proportional to frequency by the speed of light in the propagation medium. Similarly, segments of light generated by modulation of a light source are on the order of the segment length, which is directly inversely proportional to modulation rate by the speed of light in the propagation medium.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. An optical signal receiver comprising:
   a first multimode waveguide for receiving a complex modulated optical signal that has been transmitted via free space and that has been coupled to the first multimode waveguide without any wavefront correction or phase mitigation, the complex modulated optical signal comprising a plurality of modes having a plurality of different relative phases including any of wavefront distorted complex modulated signals, and random phase signals, wherein the first multimode waveguide is not a single mode fiber, and wherein relative phases of the complex modulated optical signal between multiple modes in the first multimode waveguide are not preserved;
   an optical resonator that receives the complex modulated optical signal from the first multimode waveguide and converts the complex modulated optical signal to an intensity modulated signal;
   a detector that is configured to convert the intensity modulated signal into an electrical signal, the electrical signal having an amplitude indicative of an intensity of the intensity modulated signal from the optical resonator, and that provides a detected signal; and a second multimode waveguide coupling an output of the optical resonator to the detector and that provides the intensity modulated signal from the optical resonator to the detector.

2. The optical signal receiver of claim 1, wherein the first multimode waveguide is a first multimode fiber.

3. The optical signal receiver of claim 1, wherein the receiver accounts for any wavefront distortion for detection without any adaptive optics and any local oscillators or mixers for measuring phase of the complex modulated optical signal.

4. The optical signal receiver of claim 1, wherein the first multimode waveguide is a first multimode fiber that includes one of a step index fiber, a graded multimode fiber, and a spatial division multiplex multimode fiber.

5. The optical signal receiver of claim 1, wherein the optical resonator has a plurality of regions, wherein each region is configured to produce a temporary change in intensity of the optical signal energy in response to a phase change in the complex modulated optical signal so as to provide an average change in intensity of the intensity modulated signal that is related to the magnitude of plurality of absolute phase changes of the complex modulated optical signal.

6. The optical signal receiver of claim 1, further comprising a processor that receives the detected signal and that processes it so as to mitigate any effects of phase disturbance to the complex modulated optical signal and to determine information encoded in the complex modulated optical signal.

7. The optical signal receiver of claim 1, wherein the first multimode waveguide is a first multimode fiber and wherein the second multimode waveguide is a second multimode fiber.

8. An optical system comprising:

a transmitter that transmits a complex modulated optical signal comprising a plurality of modes having a plurality of different relative phases including any of wavefront distorted complex modulated signals, and random phase signals over a medium; and a receiver that receives that complex modulated optical signal and determines information encoded in the complex modulated optical signal, the receiver including:

a first multimode waveguide that receives the complex modulated optical signal that has been transmitted via the medium and that has been coupled to the first multimode waveguide without any wavefront correction or phase mitigation, wherein the first multimode waveguide is not a single mode fiber, and wherein relative phases of the complex modulated optical signal between multiple modes in the first multimode waveguide are not preserved;

an optical resonator that receives the complex modulated optical signal from the first multimode waveguide and converts the complex modulated optical signal to an intensity modulated signal;

a detector that is configured to convert the intensity modulated signal into an electrical signal, the electrical signal having an amplitude indicative of an intensity of the intensity modulated signal from the optical resonator, and that provides a detected signal; and a second multimode waveguide coupling an output of the optical resonator to the detector and that provides the intensity modulated signal from the optical resonator to the detector.

9. The optical system of claim 8, wherein the medium is one of free space, a multimode fiber, water, semiconductor, glass, crystal, and a multimode waveguide.

10. The optical system of claim 8, wherein the first multimode waveguide is a first multimode fiber.

11. The optical system of claim 8, wherein the receiver accounts for any wavefront distortion for detection without any adaptive optics and any local oscillators or mixers for measuring phase of the complex modulated optical signal.

12. The optical system of claim 8, wherein the first multimode waveguide is a first multimode fiber that includes one of a step index fiber, a graded multimode fiber, and a spatial division multiplex multimode fiber.

13. The optical system of claim 8, wherein the complex modulated optical signal comprises a plurality of modes having a plurality of relative phase deviations or relative phase differences.

14. The optical system of claim 13, wherein the optical resonator has a plurality of regions, wherein each region is configured to produce a temporary change in intensity of the optical signal energy in response to a phase change in the complex modulated optical signal so as to provide an average change in intensity of the intensity modulated signal that is related to the magnitude of plurality of absolute phase changes of the complex modulated optical.

15. The optical system of claim 8, further comprising a processor that receives the detected signal and that processes it so as to mitigate any effects of phase disturbance to the complex modulated optical signal and to determine information encoded in the complex modulated optical signal.

16. The optical system of claim 8, wherein the first multimode waveguide is a first multimode fiber and wherein the second multimode waveguide between the output of the resonator and the detector is a second multimode fiber.

17. A method of detecting information encoded in a complex modulated optical signal comprising a plurality of modes having a plurality of different relative phases including any of wavefront distorted complex modulated signals, and random phase signals, the method comprising:

receiving the complex modulated optical signal that has been transmitted via a medium and that has been coupled to a first multimode waveguide without any wavefront correction or phase mitigation;

transmitting the complex modulated optical signal through the first multimode waveguide to an optical resonator, wherein relative phases of the complex modulated optical signal between multiple modes in the first multimode waveguide are not preserved;

converting the complex modulated optical signal to an intensity modulated optical signal with the optical resonator;

providing the intensity modulated optical signal from the optical resonator to a detector through a second multimode waveguide; and converting the intensity modulated optical signal into an electrical signal, the electrical signal having an amplitude indicative of an intensity of the intensity modulated signal from the optical resonator.

18. The method of claim 17, wherein the complex modulated optical signal is received over a medium, the medium being one of free space, a multimode fiber, water, semiconductor, glass, crystal, and a multimode waveguide.

19. The method of claim 17, wherein the transmitting the complex modulated optical signal comprises transmitting a plurality of modes having a plurality of relative phase deviations or relative phase differences; and further comprising receiving the complex modulated optical signal at the first multimode waveguide with the plurality of modes having the plurality of relative phase deviations or relative phase differences caused by transmission through free space.

20. The method of claim 17, wherein the converting comprises providing an average change in intensity of the intensity modulated signal that is related to the magnitude of plurality of absolute phase changes of the complex modulated optical signal.

21. The method of claim 17, further comprising processing the detected signal to mitigate any effects of phase disturbance to the complex modulated optical signal and to determine information encoded in the complex modulated optical signal.

22. The method of claim 17, wherein the first multimode waveguide is a first multimode fiber and wherein the second multimode waveguide is a second multimode fiber.

* * * * *